United States Patent
Yasuno

(10) Patent No.: US 11,131,535 B2
(45) Date of Patent: Sep. 28, 2021

(54) ROTARY STAND

(71) Applicant: Mitutoyo Corporation, Kanagawa (JP)

(72) Inventor: Junsuke Yasuno, Kure (JP)

(73) Assignee: MITUTOYO CORPORATION, Kawasaki (JP)

(*) Notice: Subject to any disclaimer, the term of this patent is extended or adjusted under 35 U.S.C. 154(b) by 0 days.

(21) Appl. No.: 16/817,978

(22) Filed: Mar. 13, 2020

(65) Prior Publication Data
US 2020/0309503 A1 Oct. 1, 2020

(30) Foreign Application Priority Data

Mar. 26, 2019 (JP) .............................. JP2019-059513

(51) Int. Cl.
*G01B 5/20* (2006.01)
*F16M 11/18* (2006.01)
*F16M 11/08* (2006.01)

(52) U.S. Cl.
CPC ............ *G01B 5/201* (2013.01); *F16M 11/08* (2013.01); *F16M 11/18* (2013.01)

(58) Field of Classification Search
CPC ...... G01B 5/201; G01B 5/0004; G01B 21/20; G01B 5/0007; F16M 11/18; F16M 11/08; F16M 11/00
USPC ....................................................... 248/425
See application file for complete search history.

(56) References Cited

U.S. PATENT DOCUMENTS

| | | | | |
|---|---|---|---|---|
| 3,125,811 | A * | 3/1964 | Pierce et al. ........... | G01B 7/282 33/550 |
| 6,196,073 | B1 * | 3/2001 | Harding ............... | A63B 47/008 73/862.381 |
| 9,393,089 | B1 * | 7/2016 | Al-Shehri ............... | B25B 5/067 |
| 2003/0006756 | A1 * | 1/2003 | Tsuruta ............... | F16C 32/0674 269/21 |
| 2011/0162499 | A1 * | 7/2011 | Cooper .................... | B26D 5/32 83/76.8 |
| 2016/0084631 | A1 * | 3/2016 | Nakayama ............. | G01B 5/201 33/550 |

FOREIGN PATENT DOCUMENTS

| | | |
|---|---|---|
| JP | 2569390 | 1/1997 |
| JP | 2863070 | 3/1999 |
| JP | 2001-201340 | 7/2001 |

* cited by examiner

*Primary Examiner* — Muhammad Ijaz
(74) *Attorney, Agent, or Firm* — Rankin, Hill & Clark LLP

(57) ABSTRACT

There is provided a rotary stand capable of reducing the load on a feeder and deformation of a placement plane. A rotary stand includes a feeder that adjusts an inclination of a placement plane. The feeder includes a first contact portion that interlocks with a feeding mechanism to move and a second contact portion pressurized by a spring. The first contact portion and the second contact portion disposed to face each other in the movement direction to sandwich a held part interlocking with the placement plane.

3 Claims, 11 Drawing Sheets

ROTARY STAND

INCORPORATION BY REFERENCE

This application is based upon and claims the benefit of priority from Japanese patent application No. 2019-059513, filed on Mar. 26, 2019, the disclosure of which are incorporated herein in its entirety by reference.

BACKGROUND OF THE INVENTION

1. Field of the Invention

The present invention relates to a rotary stand, and particularly relates to an inclining mechanism of a rotary stand.

2. Description of Related Art

Conventionally, an apparatus including a rotary stand for placing an object thereon and rotating it, especially a roundness measuring machine that measures the roundness, concentricity, or coaxiality of an object to be measured, such as a cylinder or the like, has been widely used. A roundness measuring machine calculates the roundness of an object to be measured by detecting and collecting, with a probe or the like, surface position data on the object to be measured while rotating a rotary stand on which the object to be measured is placed. In order to measure the roundness, levelling needs to be performed to align the rotation shaft of the rotary stand with the central axis of the object to be measured. For this reason, the rotary stand generally includes an inclination adjustment means for levelling.

JP 2863070 B, JP 2569390 B, and JP 2001-201340 A each disclose an example of a roundness measuring machine including a conventional rotary stand.

FIG. 10 shows the appearance of a roundness measuring machine including a rotary table 900 (corresponding to a rotary stand). The rotary table 900 includes an inclination adjustment means 902 for adjusting the inclination amount of a placement plane 901 in the X direction and an inclination adjustment means 903 for adjusting the inclination amount in the Y direction. FIG. 11 is a sectional view showing a detailed structure of the rotary table 901. The rotary table 901 includes a rotary base 904 rotatably supported by a rotation shaft 905 of a driving motor, a placement plane 901 supported so as to be movable and swingable on the rotary base 904 in the X and Y directions, and an X-direction inclination adjustment means 902.

The X-direction inclination adjustment means 902 includes a rotary knob 906 capable of feeding a spindle 907 rightward and leftward in the drawing. A base part 908 of the rotary knob 906 is fixed to the rotary base 904 via a connecting member 909. The tip of the spindle 907 is in contact with the side of a supporting part 910 of the placement plane 901 via an interlocking member 911. The interlocking member 911 is slidably supported by a supporting member 912, and the supporting member 912 is fixed to the rotary base 904. By operating the knob 906, the supporting part 910 moves rightward and leftward in FIG. 11 via the spindle 907 and the connecting member 909. Then, the relative contact position between an inclination ring 913 and the placement plane 901 changes. When, for example, the placement plane 901 moves rightward in the drawing (referred to as a pushing direction), the placement plane 901 is rotated and inclined in the counterclockwise direction against the biasing force of a tension spring 914 in the clockwise direction. On the other hand, when the placement plane 901 moves leftward in the drawing (referred to as a pulling direction), the placement plane 901 is rotated and inclined in the clockwise direction by the biasing force of the tension spring 914 in the clockwise direction.

SUMMARY OF THE INVENTION

The tension spring 914 in FIG. 11 causes, with its biasing force, the placement plane 901 to follow the movement of the spindle 907 when the spindle 907 is moved in the pulling direction. That is, the tension spring 914 pressurizes and holds the placement plane 901 so that the interlocking member 911 interlocking with the spindle 907 is always in contact with the supporting part 910. This holding force needs to be sufficiently high against an external force, such as the weight of an object to be measured placed on the placement plane 901, the inertia force generated when the rotary table 900 rotates, or the like. If the holding force is not sufficiently high against an external force, this causes the placement plane 901 to unexpectedly incline or oscillate. Especially, oscillation deteriorates the measurement accuracy. In addition, in order to accurately measure an object to be measured with large inertia and to quickly accurately position the rotary table 900, the holding force is preferably high.

However, to increase a pressure on the placement plane 901 and a holding force with a conventional structure means to increase the load on a feeder. The feeder is, for example, a screw-type feeding mechanism constituted by the knob 906, the spindle 907, the connecting member 909, and the like in FIG. 11. If, for example, a high-efficiency screw, such as a ball screw, is used, increase in a pressure can cause an undesirable phenomenon, such as reverse-starting of the screw. In addition, a motor drive mechanism can be used as the feeder, but increase in a pressure causes upsizing of the motor. Furthermore, increase in a pressure can cause deformation of the placement plane 901, and this can make an object to be measured placed unstably and adversely affect high accuracy measurement. Moreover, since a spring stretches and contracts according to an inclination amount and the elastic force varies with a conventional structure, an elastic force higher than the minimum force for holding needs to be generated. Thus, such a conventional structure easily causes the above undesirable phenomenon. Although decrease in a spring constant can avoid the problem, this generally requires a spring to be upsized and causes a layout problem.

The present invention has been made to solve these problems and is to provide a rotary stand capable of reducing the load on a feeder and deformation of a placement plane.

A rotary stand according to an embodiment of the present invention includes a feeder that adjusts an inclination of a placement plane, in which the feeder includes a first contact portion that interlocks with a feeding mechanism to move, and a second contact portion pressurized by a spring, and the first contact portion and the second contact portion disposed to face each other in the movement direction sandwich a held part interlocking with the placement plane.

In a rotary stand according to an embodiment of the present invention, at least one of the first contact portion and the second contact portion includes a self-aligning ball bearing, and the self-aligning ball bearing is in contact with the held part.

A rotary stand according to an embodiment of the present invention includes a feeder that adjusts an inclination of a placement plane, in which the feeder includes a contact portion that interlocks with a feeding mechanism to move and to be brought in contact with the placement plane, and a tension part pressurized by a spring and having one end connected to the placement plane, and an external force applied to the placement plane by the contact portion and an external force applied to the placement plane by the tension part are balanced.

According to the present invention, it is possible to provide a rotary stand capable of reducing the load on a feeder and deformation of a placement plane.

DETAILED DESCRIPTION

Hereinafter, specific embodiments to which the present invention is applied are described detailedly with reference to the drawings.

First Exemplary Embodiment

Figure 1:
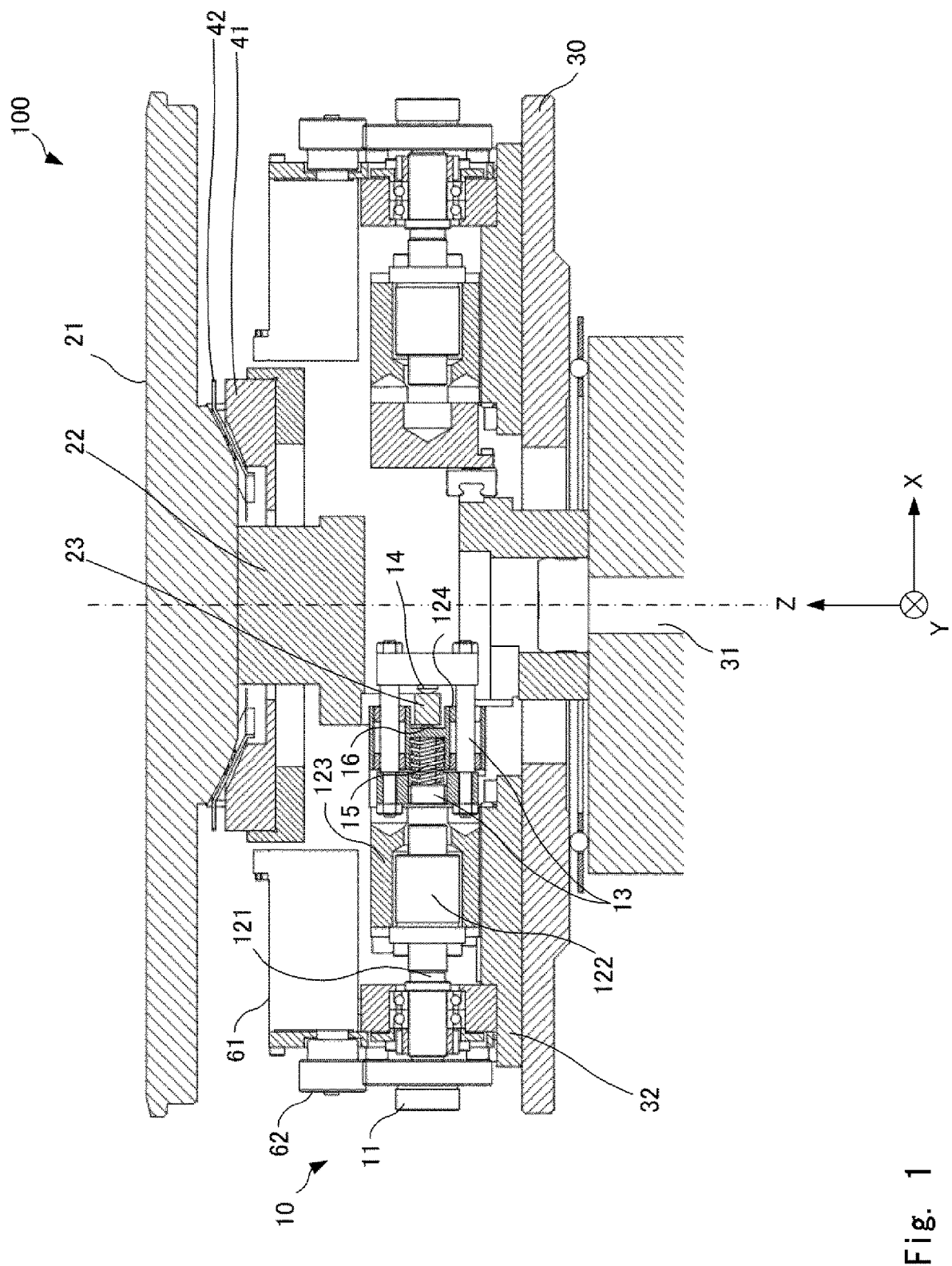
FIG. 1 is a sectional view of an entire structure of a rotary stand 100 according to a first exemplary embodiment of the present invention.
Figure 2:
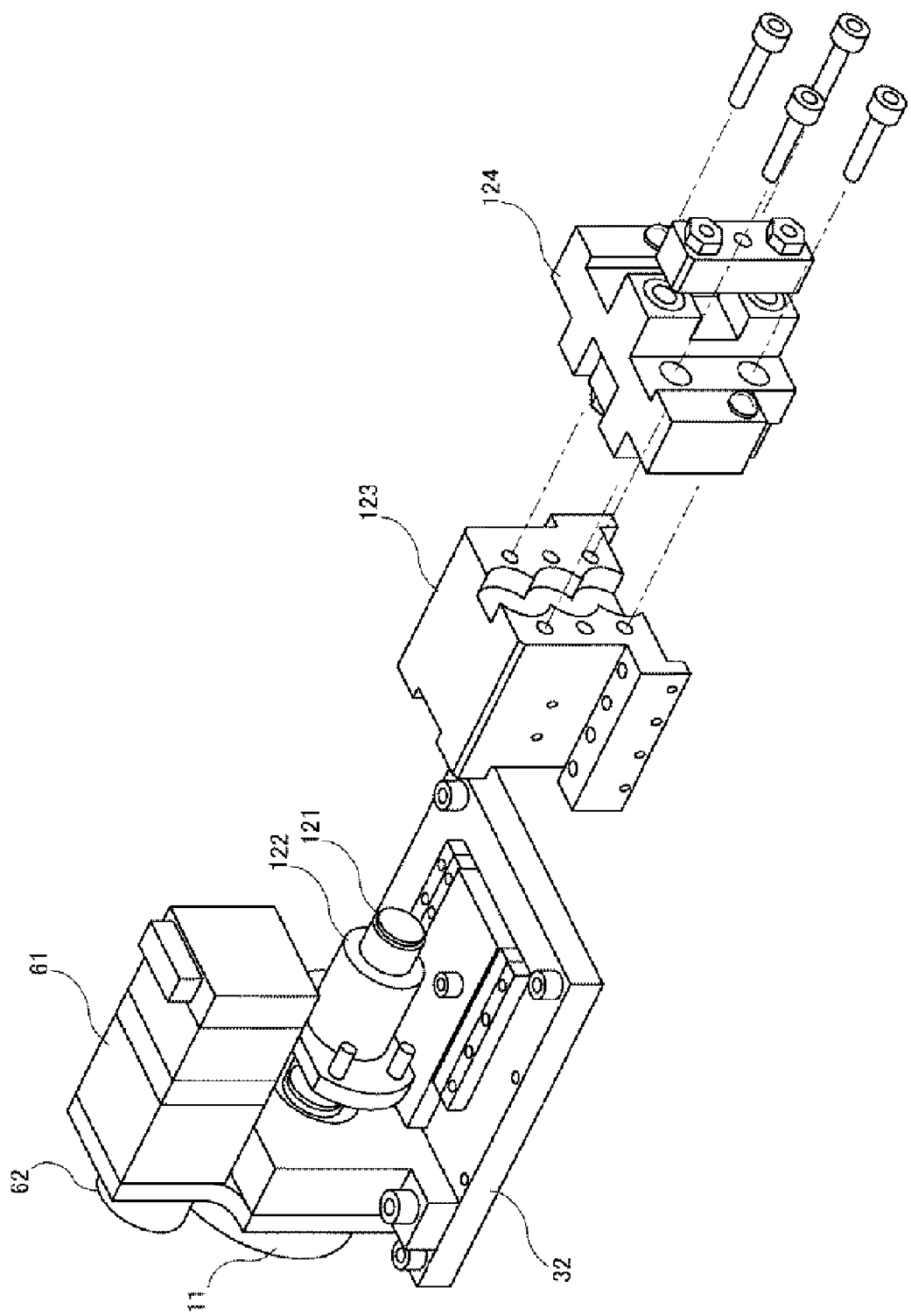
FIG. 2 is a perspective view (exploded view) of the structure of the rotary stand 100 according to the first exemplary embodiment of the present invention.
Figure 3:
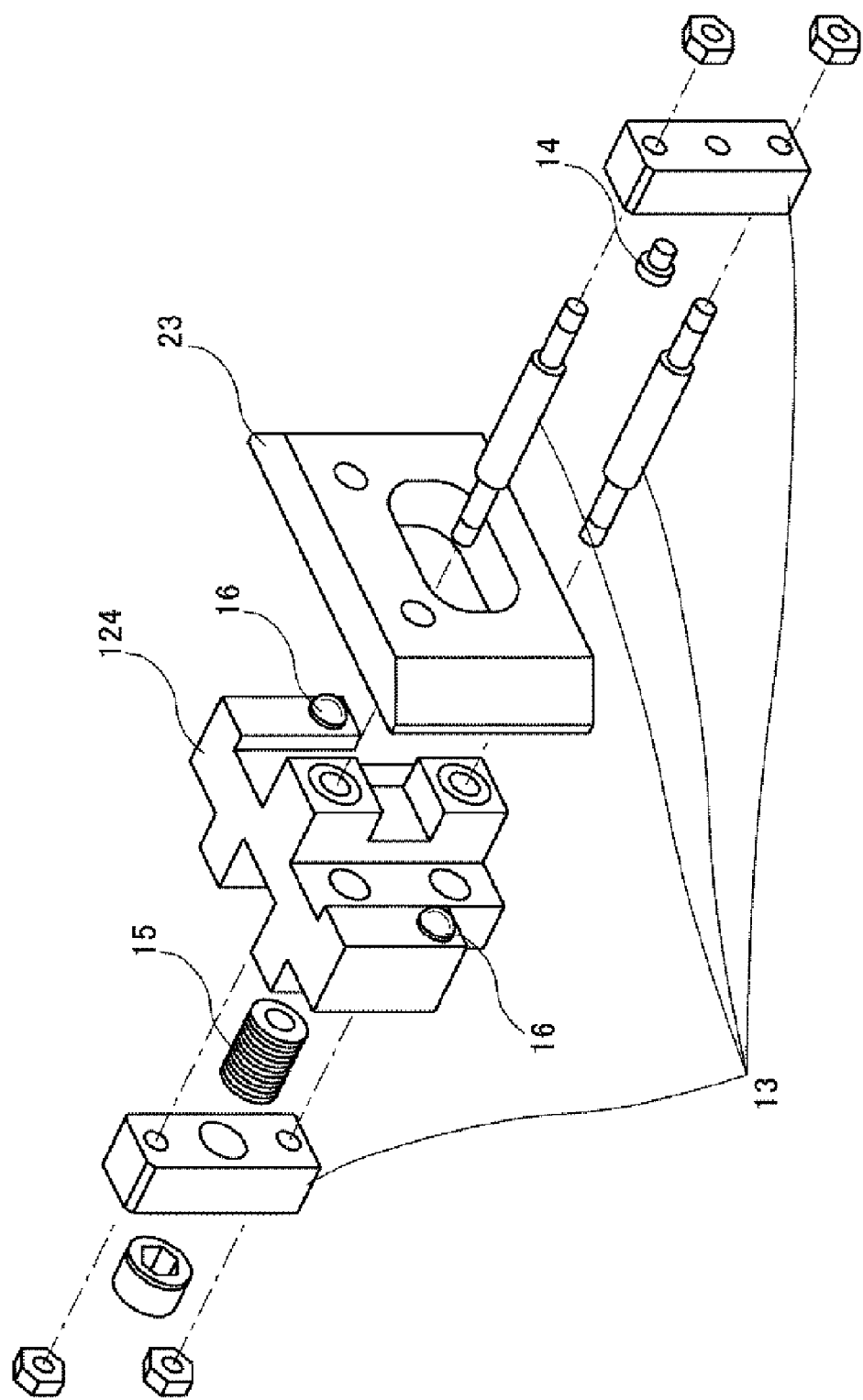
FIG. 3 is a perspective view (exploded view) of the structure of the rotary stand 100 according to the first exemplary embodiment of the present invention.
Figure 4:
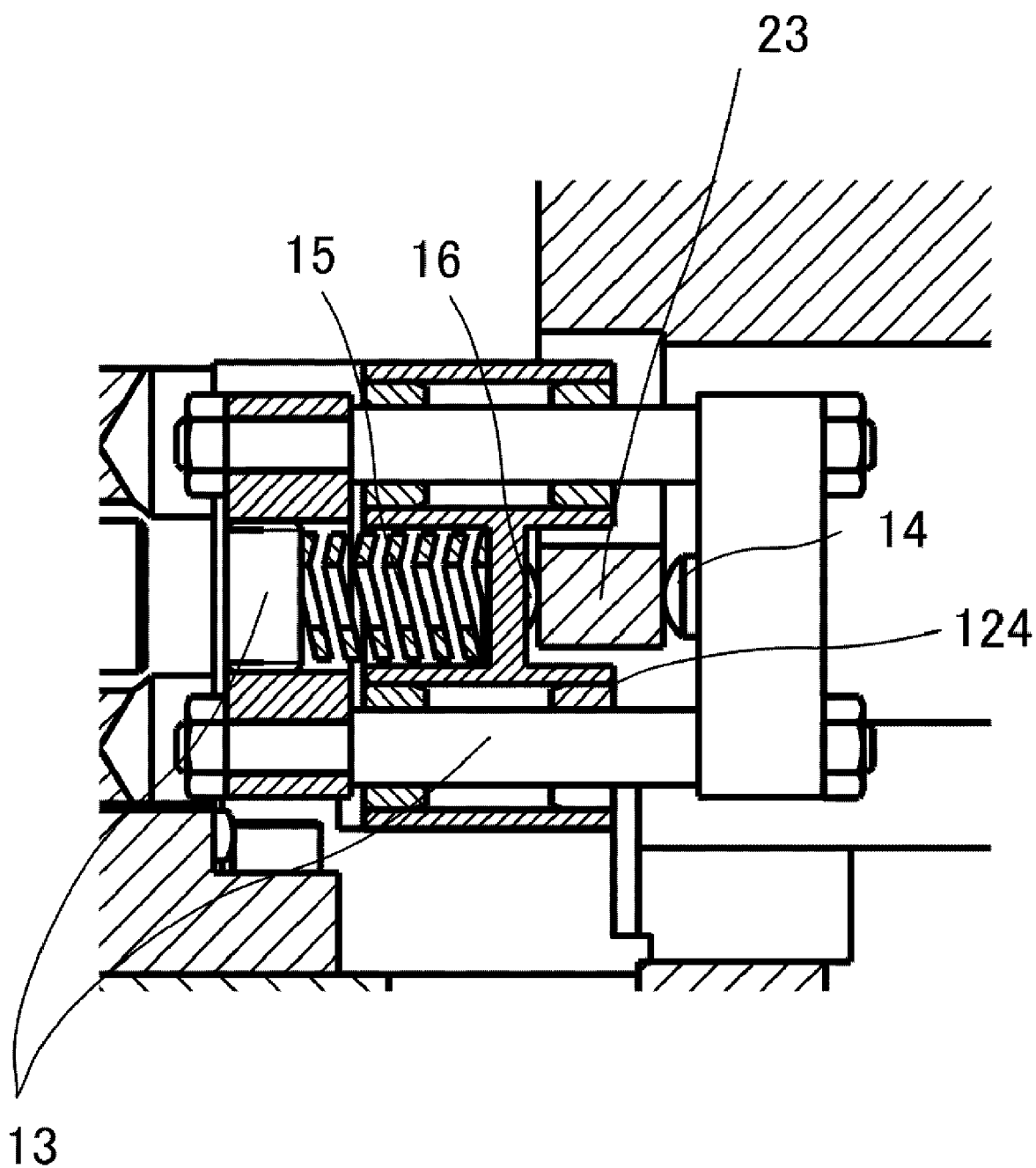
FIG. 4 is a sectional view (enlarged view) of the structure of the rotary stand 100 according to the first exemplary embodiment of the present invention.

With reference to a sectional view in FIG. 1, perspective views (exploded views) in FIGS. 2 and 3, and a sectional view (enlarged view) in FIG. 4, a structure of a rotary stand 100 according to a first exemplary embodiment of the present invention is described. The rotary stand 100 includes a rotary base 30 rotatably supported by a rotation shaft 31 of a driving motor, a placement plane 21 supported on the rotary base 30 so as to be swingable, and a feeder 10 that adjusts an inclination of the placement plane 21 with respect to the X axis.

The feeder 10 includes a driven gear 11 that receives power from a motor 61 via a driving gear 62, a feed screw (ball screw) 121 that rotates with the rotation of the driven gear 11, a feed screw (nut) 122 that moves in the X-axis direction with the rotation of the feed screw (ball screw) 121, and sliders 123 and 124 combined with the feed screw (nut) 122. This mechanism for moving the slider 124 is referred to as a feeding mechanism 12. A pressurizing member 13 penetrates and is combined with the slider 124 so as to be slidable in the X-axis direction for a certain width. The slider 124 and the pressurizing member 13 are connected with each other via a spring 15.

A held part 23 extending from a projecting part 22 that is a supporting part of the placement plane 21 is in contact with a contact portion 14 in the X direction (the positive direction of the X axis) and in contact with a contact portion 16 in the −X direction (the negative direction of the X axis). The contact portion 14 and the contact portion 16 are, for example, metal members the tips of which are each machined into a spherical shape. The contact portion 14 is fixed to the pressurizing member 13. The contact portion 16 is fixed to the slider 124. That is, the held part 23 is sandwiched by the contact portion 14 of the pressurizing member 13 pressurized by the spring 15 and the contact portion 16 fixed to the slider 124.

When the slider 124 moves in the X direction according to the drive of the motor 61, the contact portion 16 is brought into contact with the held part 23. This adds the force pushing the placement plane 21 in the X direction. On the other hand, when the slider 124 moves in the −X direction according to the drive of the motor 61, the pressurizing member 13 interferes and also moves in the −X direction, and the contact portion 14 is brought into contact with the held part 23. This adds the force pushing the placement plane 21 in the −X direction.

There is disposed a steel ball between the placement plane 21 and an inclination ring 41, and the steel ball is held by a holder 42 so as not to fall from the inclination ring 41. Thus, the placement plane 21 and the inclination ring 41 are rollable. When the placement plane 21 is pushed in the X direction, the placement plane 21 is rotated and inclined along the inclination ring 41 in the counterclockwise direction. When the placement plane 21 is pushed in the −X direction, the placement plane 21 is rotated and inclined along the inclination ring 41 in the clockwise direction.

In the present embodiment, the feeder 10 has the structure for holding the held part 23, and the spring 15 that pressurizes the placement plane 21 is disposed in this holding structure. Thus, it is possible to reduce the load on the feeder 10 and deformation of the placement plane 21. Accordingly, it is possible to increase a holding force with a pressure higher than a conventional structure.

Second Exemplary Embodiment

Generally, a rotary stand includes a feeder for adjusting an inclination in the X-axis direction and a feeder for adjusting an inclination in the Y-axis direction. For example, the rotary stand 100 in the first exemplary embodiment is assumed to includes the held parts 23 and the feeders 10 for adjusting inclinations in the X-axis direction and the Y-axis direction, the held part 23 slides along the contact portions 14 and 16 in the Y-axis direction in the holding structure of the X-axis-direction feeder 10 when the Y-axis-direction feeder 10 drives. In addition, the held part 23 slides along the contact portion 14 and 16 in X-axis direction in the holding structure of the Y-axis-direction feeder 10 when the X-axis-direction feeder 10 drives. At this time, if a holding force is increased by increasing a pressure, the frictional force generated between the held part 23 and the contact portion 14 and 16 is also increased. Then, lost motion is generated and the accuracy of levelling can be deteriorated. This causes a problem, for example, that the inclination cannot be adjusted with desired accuracy or that the inclination must be adjusted a plurality of times. In the present embodiment, a mechanism for reducing the frictional force generated between the held part 23 and the contact portion 14 and 16 in the first exemplary embodiment is provided in order to solve the problem.

Figure 5:
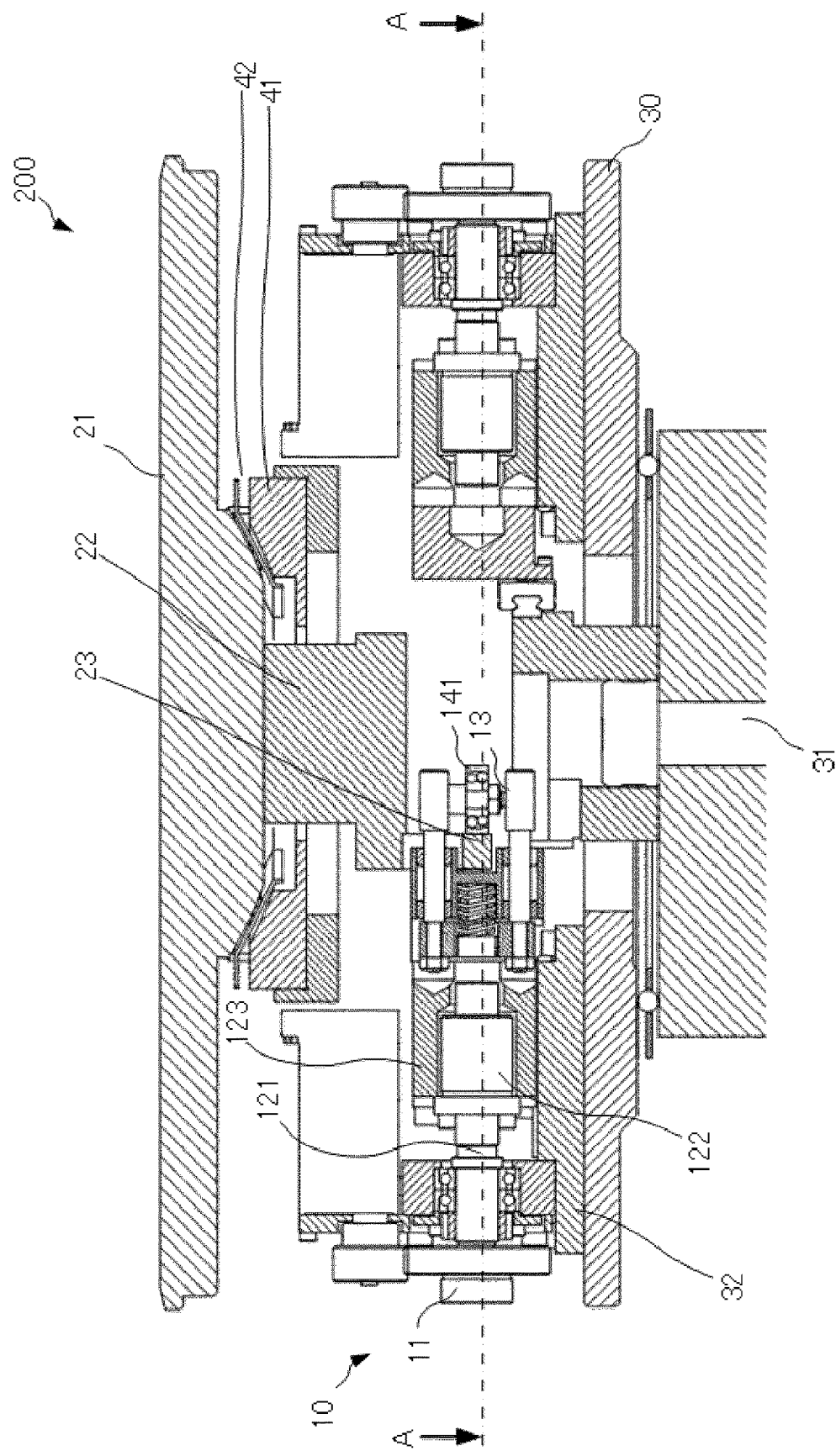
FIG. 5 is a sectional view of an entire structure of a rotary stand 200 according to a second exemplary embodiment of the present invention.
Figure 6:
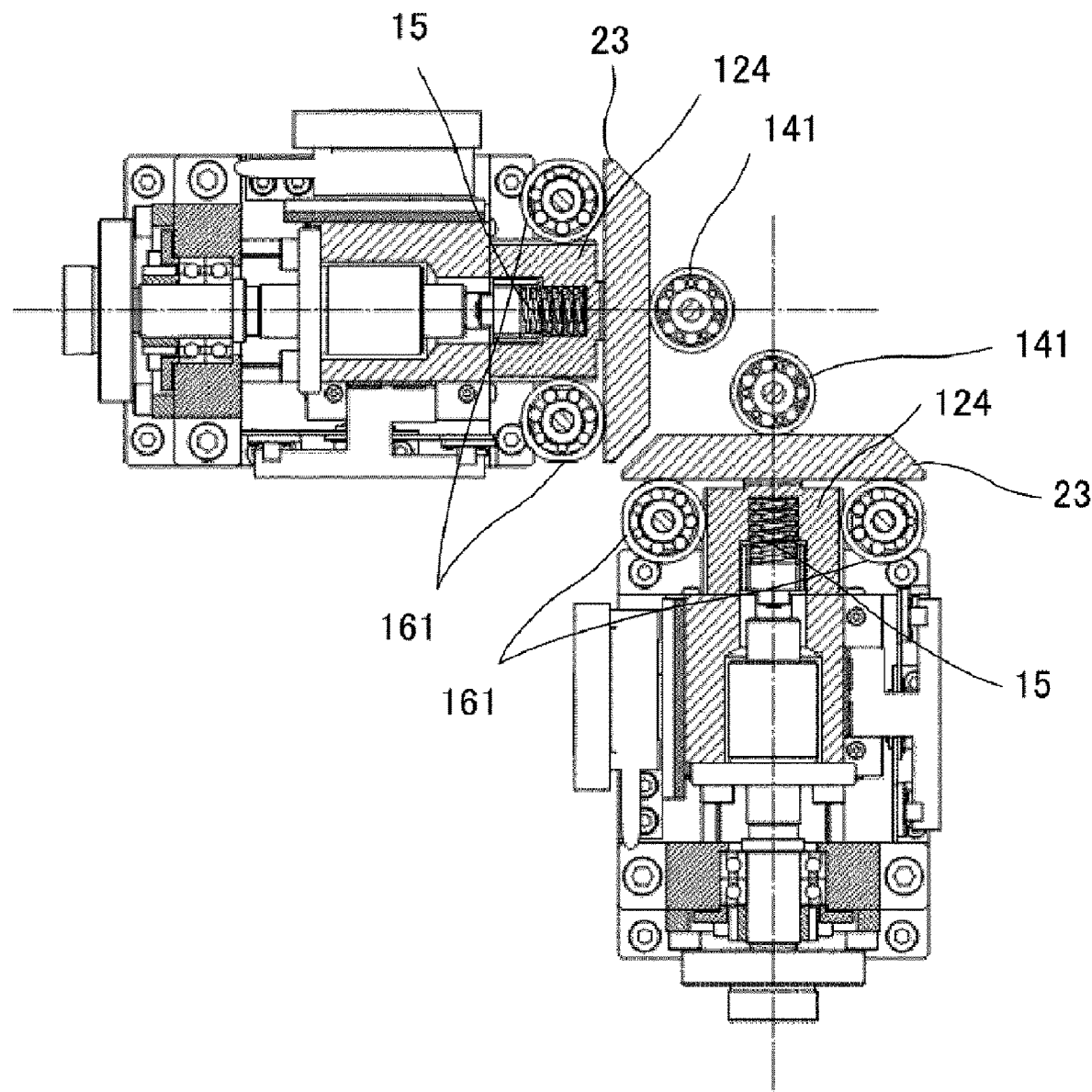
FIG. 6 is a sectional view of the entire structure of the rotary stand 200 according to the second exemplary embodiment of the present invention.

With reference to FIG. 5, and FIG. 6 that is the A-A sectional view of FIG. 5, a structure of a rotary stand 200 according to a second exemplary embodiment of the present invention is described. Note that, the description of the structure common to that in the first exemplary embodiment is omitted. In the present embodiment, the rotary stand 200 includes, as a mechanism for adjusting inclinations in the X-axis direction and Y-axis direction, a feeder 10, a held part 23, and the like independently. In addition, in the present embodiment, the held part 23 is in contact with, instead of the contact portion 14 and the contact portion 16 in the first exemplary embodiment, a self-aligning ball bearing 141 and a self-aligning ball bearing 161.

As shown in FIG. 6, the self-aligning ball bearing 141 is fixed to a pressurizing member 13. The self-aligning ball bearing 161 is fixed to a slider 124. Thus, when the slider 124 moves according to the drive of a motor 61, the self-aligning ball bearing 141 and the self-aligning ball bearing 161 act on the held part 23, and a placement plane 21 moves.

For example, when the Y-axis-direction feeder 10 is operated, the held part 23, the self-aligning ball bearing 141, and the self-aligning ball bearing 161 move relatively in the Y-axis direction in the X-axis-direction feeder 10. At this time, it is possible to reduce the frictional force by rotating the self-aligning ball bearing 141 and the self-aligning ball bearing 161. In addition, when the X-axis-direction feeder 10 is operated, the held part 23, the self-aligning ball bearing 141, and the self-aligning ball bearing 161 moves relatively in the X-axis direction in the Y-axis-direction feeder 10. At this time, it is possible to reduce the frictional force by rotating the self-aligning ball bearing 141 and the self-aligning ball bearing 161.

Third Exemplary Embodiment

A third exemplary embodiment is another example of a structure capable of reducing the frictional force generated in the feeder 10.

Figure 7:
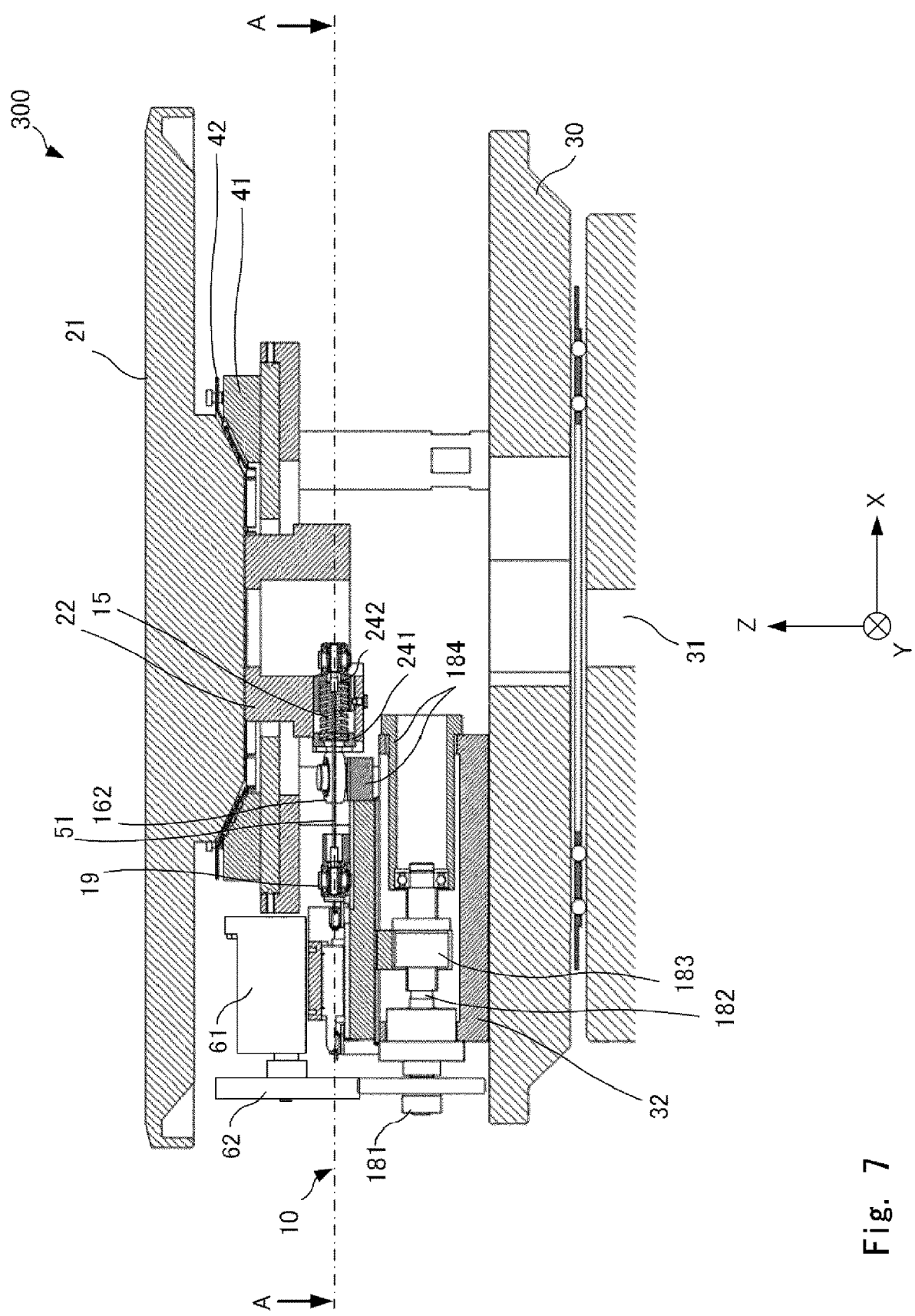
FIG. 7 is a sectional view of an entire structure of a rotary stand 300 according to a third exemplary embodiment of the present invention.
Figure 8:
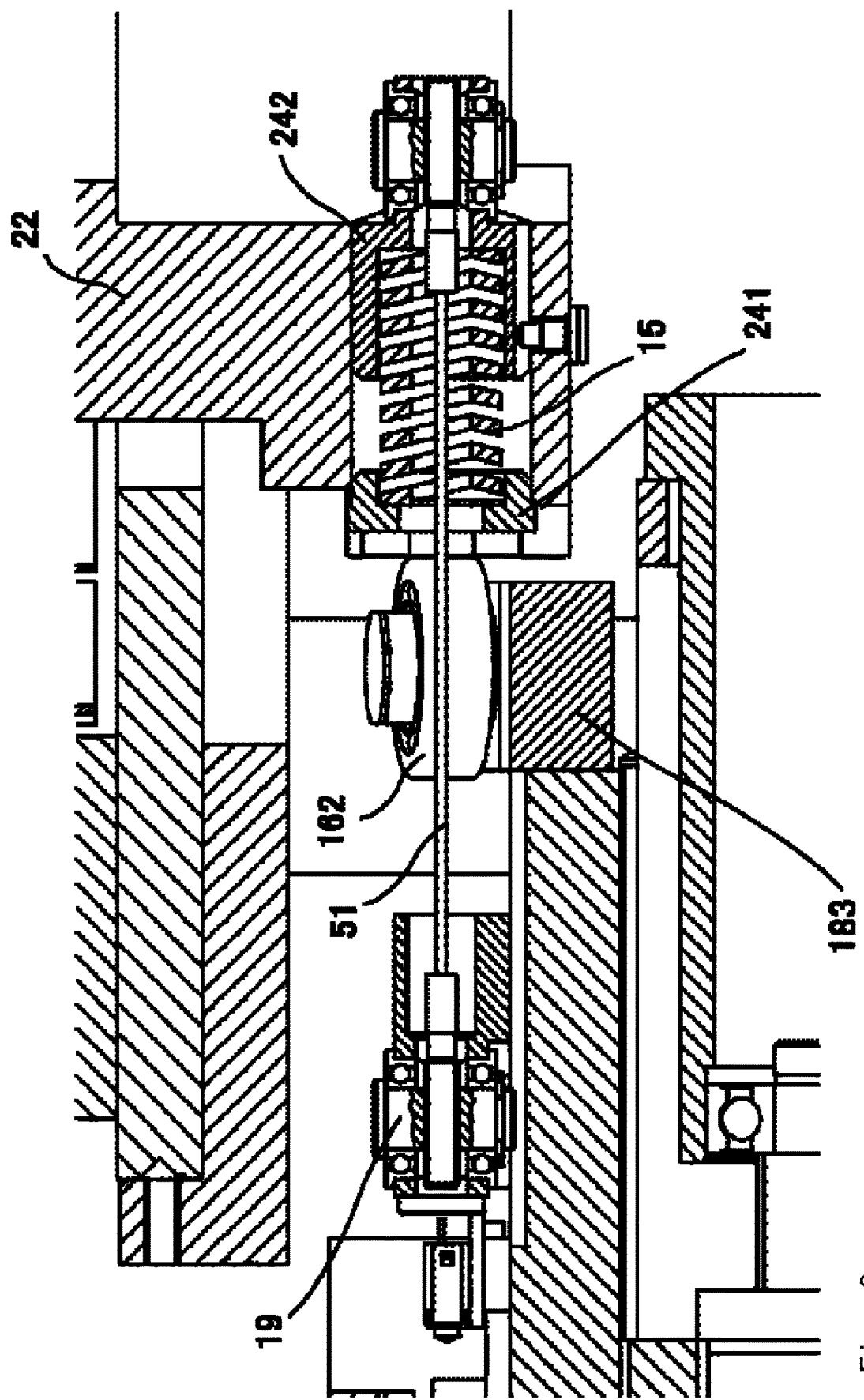
FIG. 8 is a sectional view (enlarged view) of the structure of the rotary stand 300 according to the third exemplary embodiment of the present invention.
Figure 9:
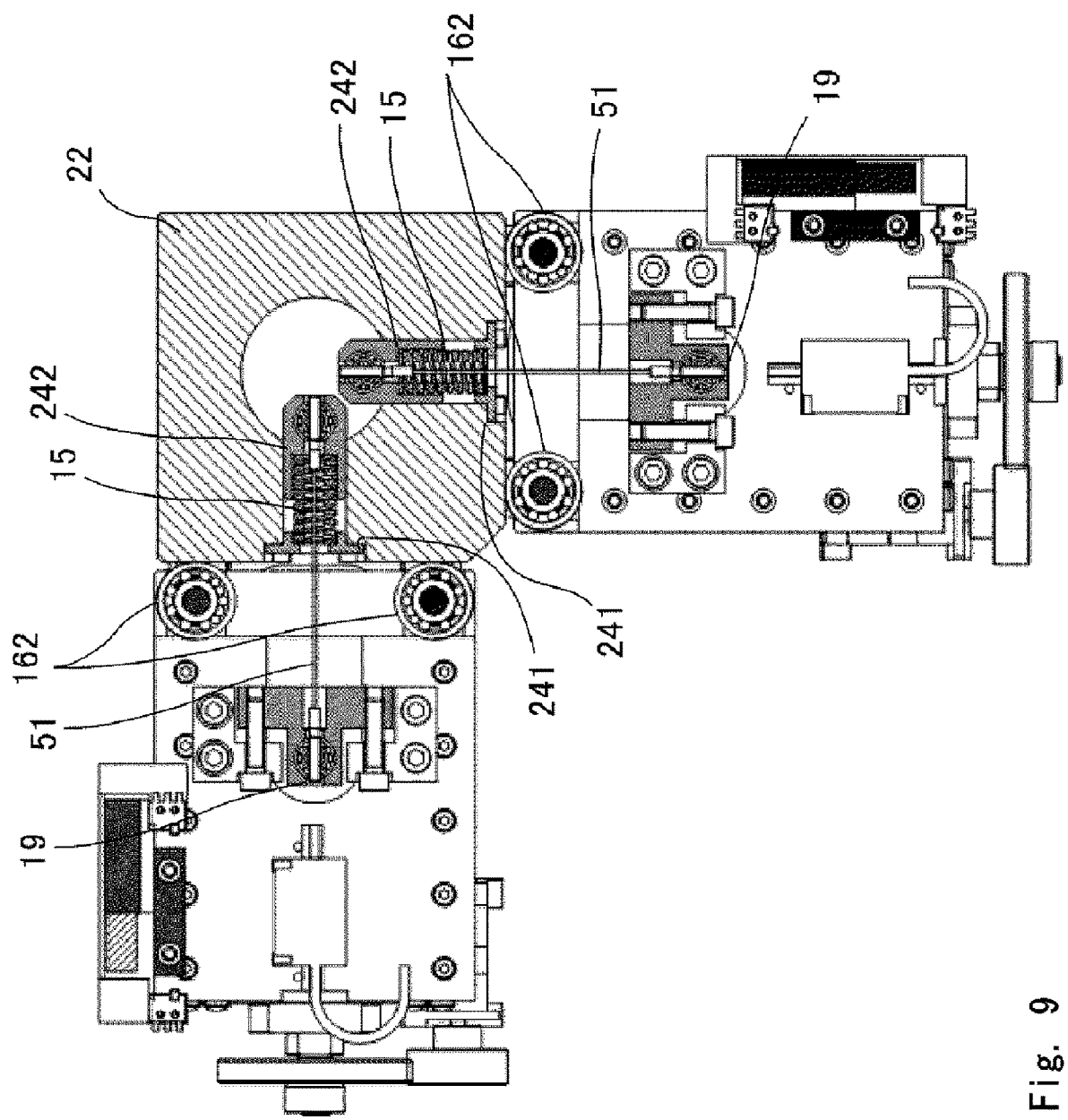
FIG. 9 is a sectional view of the entire structure of the rotary stand 300 according to the third exemplary embodiment of the present invention.
Figure 10:
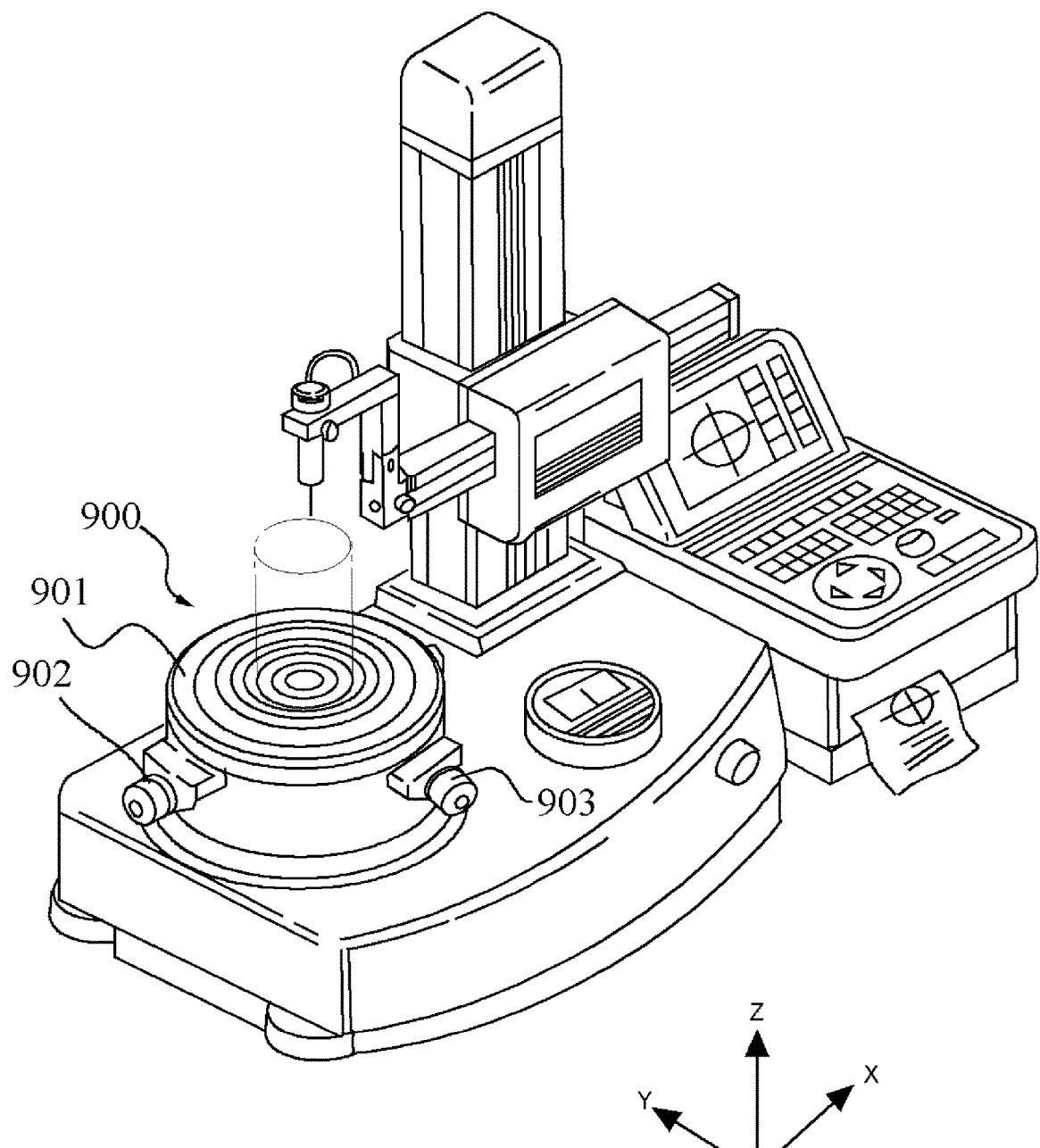
FIG. 10 is a diagram showing a structure of a conventional roundness measuring machine.
Figure 11:
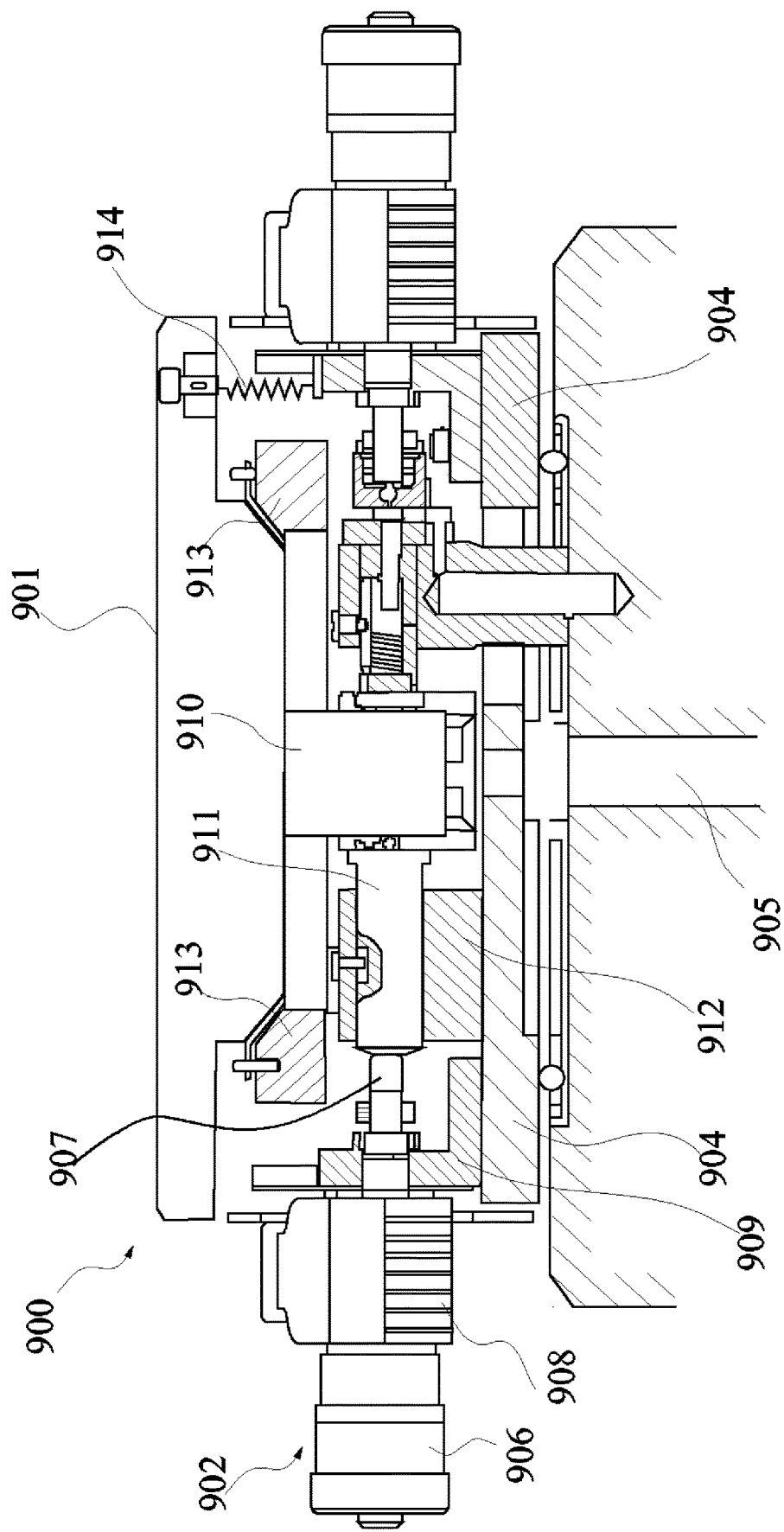
FIG. 11 is a diagram showing a structure of a conventional rotary stand.

With reference to FIGS. 7 and 8, and FIG. 9 that is the A-A sectional view of FIG. 7, a structure of a rotary stand 300 according to the third exemplary embodiment of the present invention is described. The rotary stand 300 includes a rotary base 30 rotatably supported by a rotation shaft 31 of a driving motor, a placement plane 21 supported on the rotary base 30 so as to be swingable in the X-axis direction and Y-axis direction, and a feeder 10 that adjusts an inclination of the placement plane 21. Note that, although the feeder 10 capable of adjusting an inclination in the X-axis direction is shown in the drawings, the rotary stand 300 may include the feeders 10 for adjusting inclinations in the X-axis direction and Y-axis direction as described in the second exemplary embodiment.

The feeder 10 includes a driven gear 181 that receives power of a motor 61 via a driving gear 62, a feed screw (ball screw) 182 that rotates with the rotation of the driven gear 181, a feed screw (nut) 183 that moves in the X-axis direction with the rotation of the feed screw (ball screw) 182, and a slider 184 combined with the feed screw (nut) 183. The slider 184 is in contact with a projecting part 22 via a self-aligning ball bearing 162.

A mechanism for generating the force pushing back in the X direction when the projecting part 22 is moved in the −X direction is referred to as a tension part. For example, in the example of FIG. 7, a spring (compression coil spring) 15, a wire 51, spring supporting members 241 and 242 constitute the tension part. There is a space inside the projecting part 22, and the spring 15 and the spring supporting members 241 and 242 connected to the respective ends of the spring 15 are disposed in the space. The spring supporting member 241 is fixed to the projecting part 22. The spring supporting member 242 is slidable in the X-axis direction according to stretching and contraction of the spring 15. The wire 51 is fixed to the spring supporting member 242, and a wire fixing member 19 and the spring supporting member 242 are connected by the wire 51. That is, the spring 15 has one end connected to the wire fixing member 19 via the wire 51, and its movement is fixed in the X direction. Then, the spring 15 pressurizes, via the tensioned wire 51, the projecting part 22 connected to the other end of the spring 15 via the spring supporting member 241.

Alternatively, the tension part may be constituted by connecting the fixing member 19 with the supporting member 241 by a tension coil spring.

When the slider 184 moves in the X direction according to the drive of the motor 61, the self-aligning ball bearing 162 is brought into contact with the projecting part 22. The mechanism for moving the self-aligning ball bearing 162 is referred to as a feeding mechanism 18. This adds the force pushing the placement plane 21 in the X direction. When the placement plane 21 is pushed in the X direction, the placement plane 21 is rotated and inclined along an inclination ring 41 in the counterclockwise direction. At this time, when the projecting part 22 moves in the X direction and the distance between the self-aligning ball bearing 162 and the spring supporting member 242 is shortened, the spring 15 is also compressed.

On the other hand, when the slider 184 and the self-aligning ball bearing 162 move in the −X direction according to the drive of the motor 61, the projecting part 22 and the placement plane 21 are pushed back in −X direction by the restoring force of the compressed spring 15. When the placement plane 21 is pushed in the −X direction, the placement plane 21 is rotated and inclined along the inclination ring 41 in the clockwise direction.

In the present embodiment, it is possible to reduce the frictional force with the self-aligning ball bearing 162. Especially, in the third exemplary embodiment, by removing the pressurizing self-aligning ball bearing (the self-aligning ball bearing 141 in the second exemplary embodiment), the frictional force is halved compared to the second exemplary embodiment. The self-aligning ball bearing has a feature that the axes of the inner ring and the outer ring are inclined, and follows, utilizing this feature, the projecting part 22 (the held part 23 in the second exemplary embodiment) that inclines. Since the inclination of the axes of the inner ring and the outer ring is caused not by rotation but by sliding, a large frictional force is generated. For this reason, by changing the pressurizing mechanism from a self-aligning ball bearing to the wire 51, the frictional force at the pressurizing mechanism becomes almost zero, and more stable movement has been achieved in third exemplary embodiment.

Note that, the present invention is not limited to the above embodiments, and can be appropriately changed without departing from the scope.

The invention claimed is:

1. A rotary stand comprising:
   a rotary base rotatably supported by a rotation shaft;
   a placement plane supported on the rotary base so as to be swingable;
   a feeder configured to adjust an inclination of the placement plane;
   a projecting part which supports the placement plane; and
   a held part extending from the projecting part, wherein
   the feeder comprises:
   a first contact portion configured to move by interlocking with a feeding mechanism; and
   a second contact portion pressurized by a spring, and
   the first contact portion and the second contact portion are disposed to face each other in a movement direction of the first contact portion, and the first contact portion and the second contact portion sandwich the held part.

2. The rotary stand according to claim 1, wherein at least one of the first contact portion and the second contact portion includes a self-aligning ball bearing, and
   the self-aligning ball bearing is in contact with the held part.

3. A rotary stand comprising:
   a rotary base rotatably supported by a rotation shaft;
   a placement plane supported on the rotary base so as to be swingable;
   a feeder configured to adjust an inclination of the placement plane; and
   a projecting part which supports the placement plane, wherein
   the feeder comprises:
   a contact portion configured to move by interlocking with a feeding mechanism and to be brought in contact with the projecting part to push the placement plane via the projecting part; and
   a tension part pressurized by a spring and having one end connected to the placement plane via the projecting part,
   the tension part provides the projecting part with a force in a direction opposite to a direction in which the contact portion pushes the placement plane via the projecting part, and
   an external force applied to the placement plane via the projecting part by the contact portion and an external force applied to the placement plane via the projecting part by the tension part are balanced.

* * * * *